No. 695,784. Patented Mar. 18, 1902.
T. G. BENNETT & W. MASON.
AUTOMATIC FIREARM.
(Application filed Sept. 30, 1901.)
(No Model.) 6 Sheets—Sheet 1.
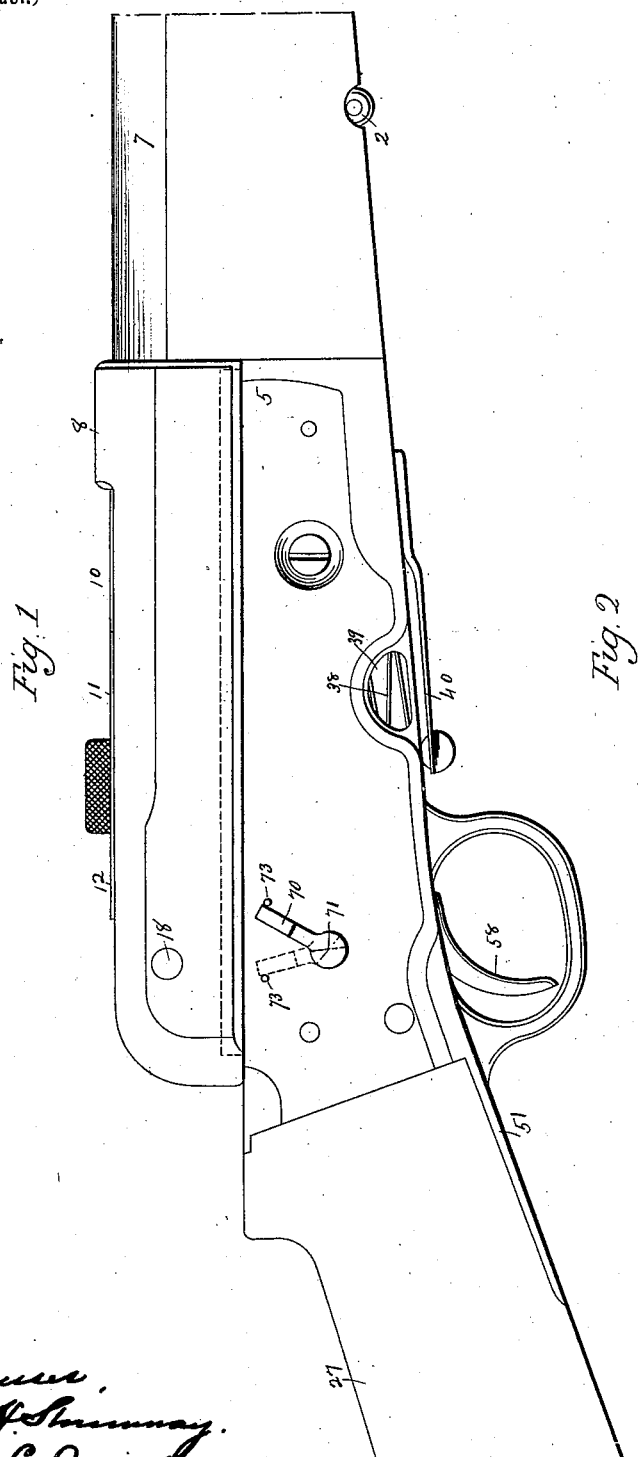
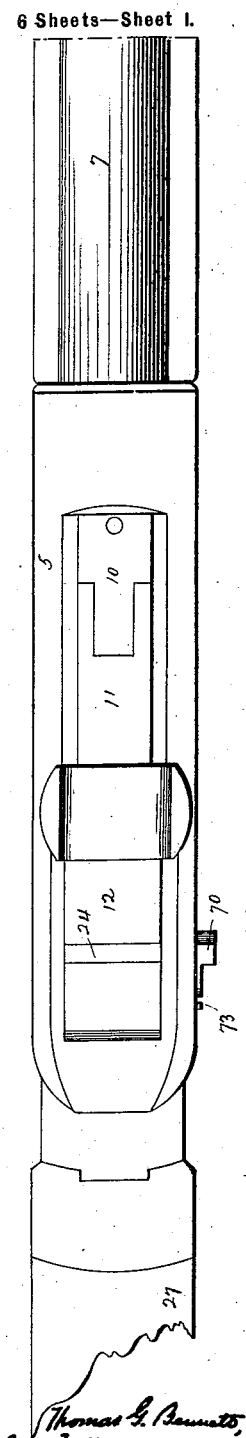

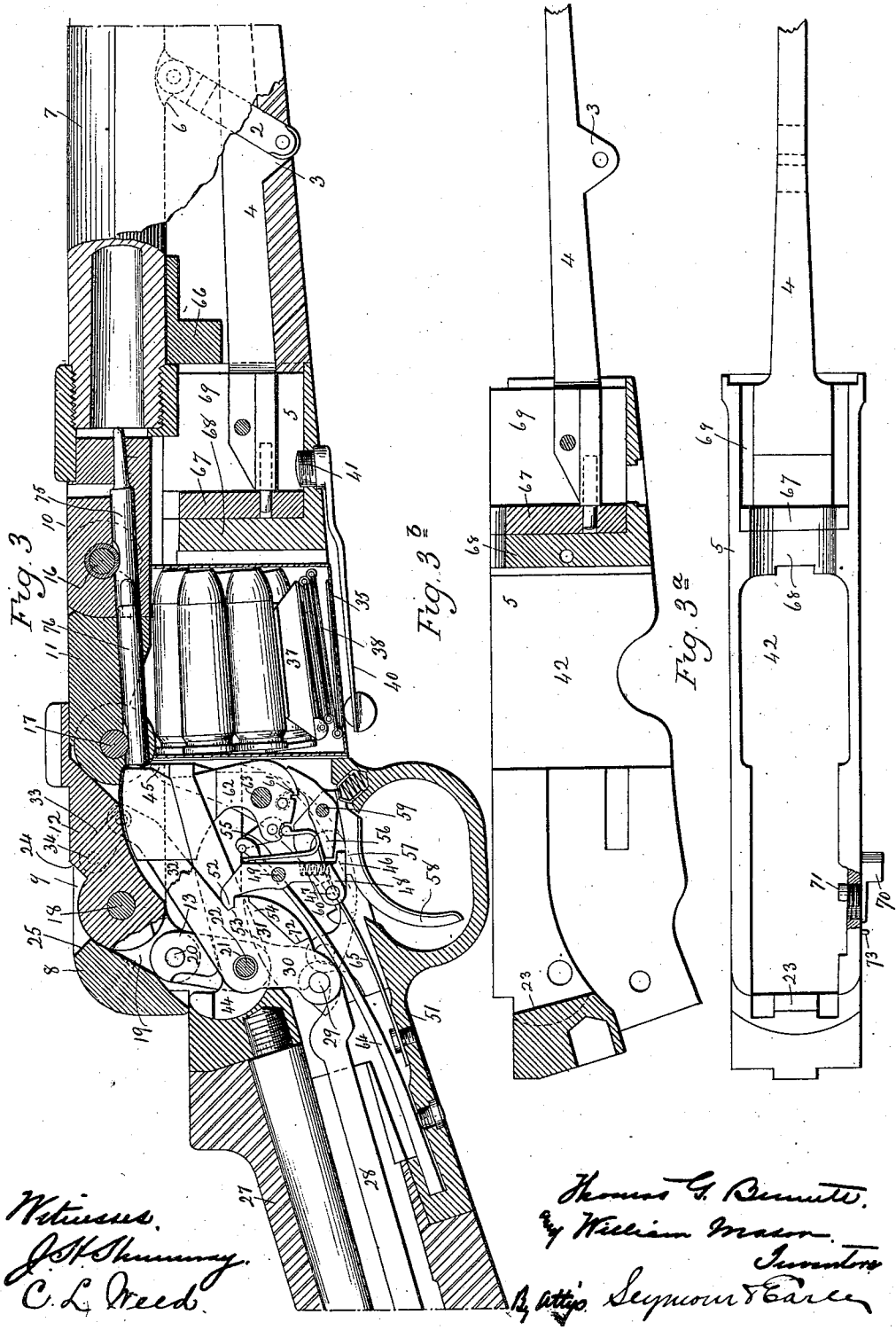

No. 695,784. Patented Mar. 18, 1902.
T. G. BENNETT & W. MASON.
AUTOMATIC FIREARM.
(Application filed Sept. 30, 1901.)
(No Model.) 6 Sheets—Sheet 3.
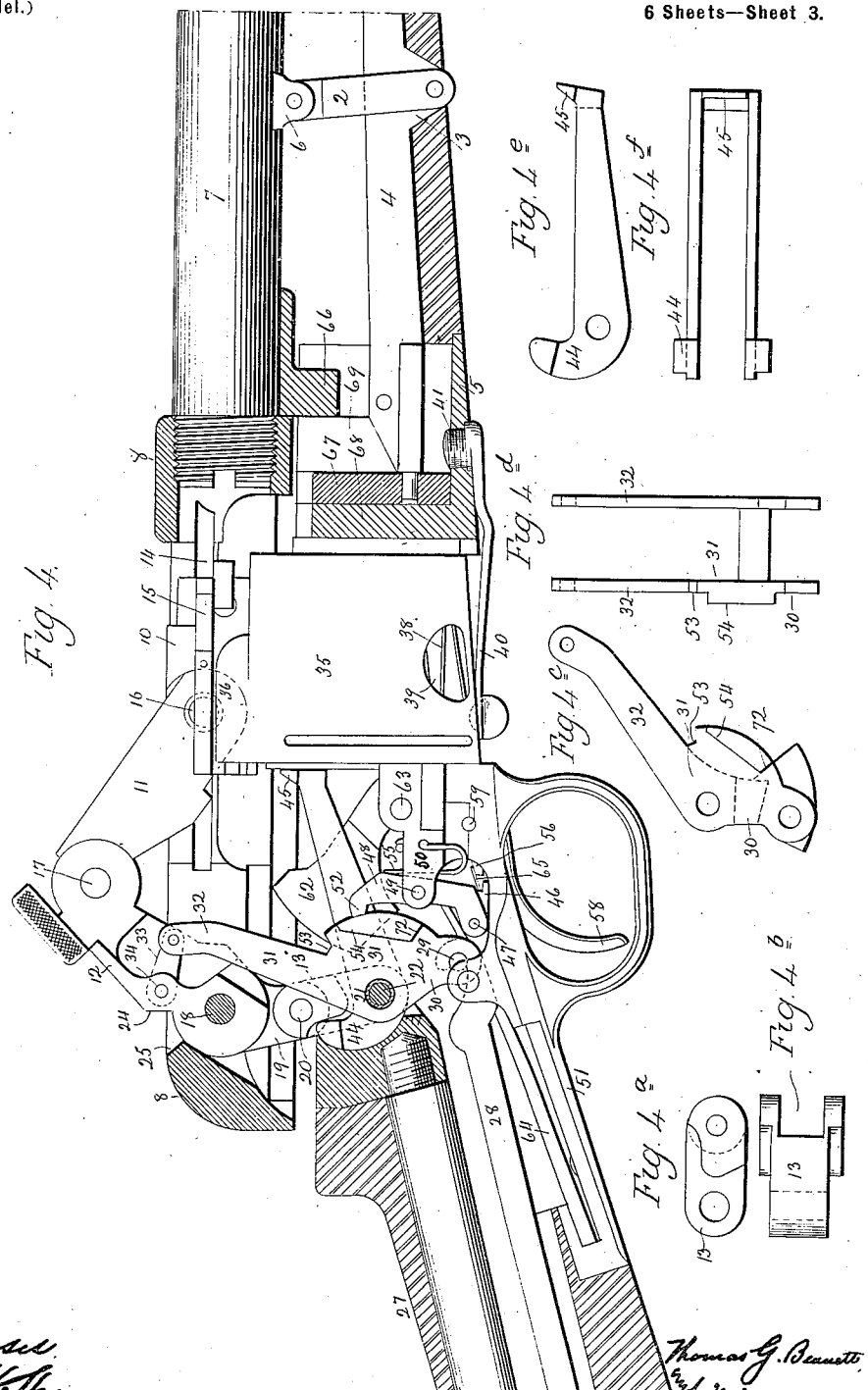

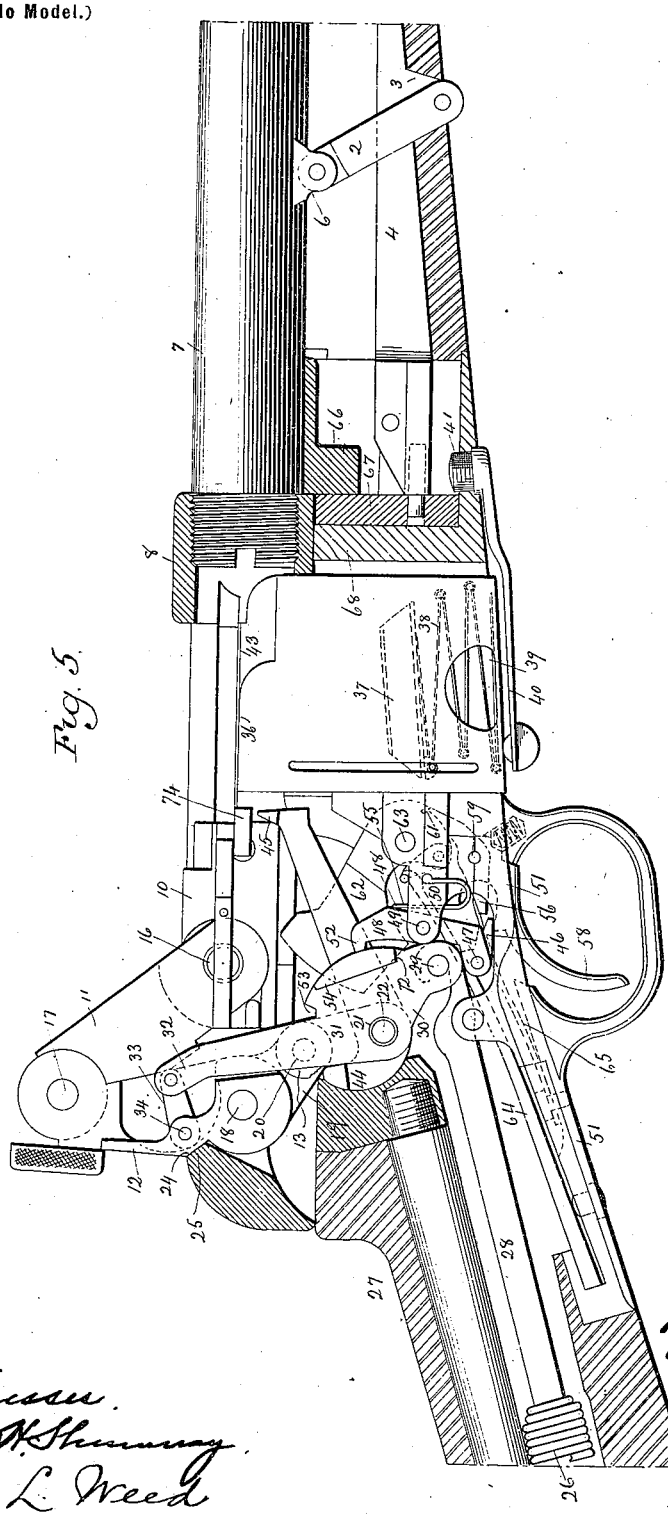

No. 695,784. Patented Mar. 18, 1902.
T. G. BENNETT & W. MASON.
AUTOMATIC FIREARM.
(Application filed Sept. 30, 1901.)
(No Model.) 6 Sheets—Sheet 5.
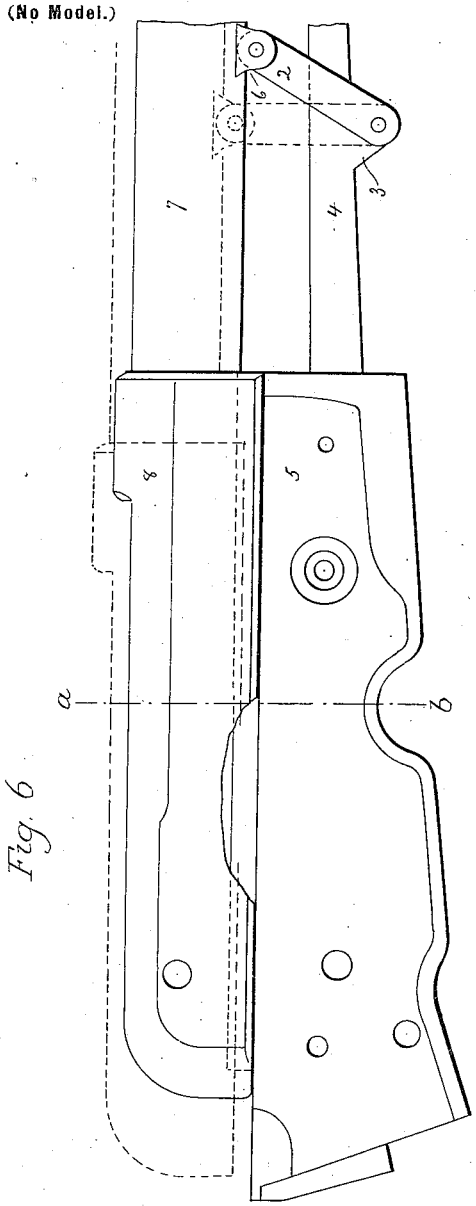
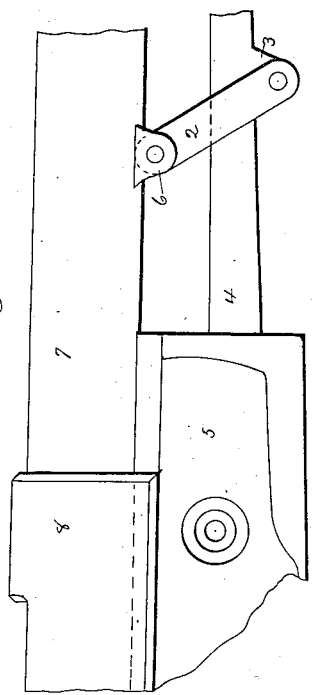
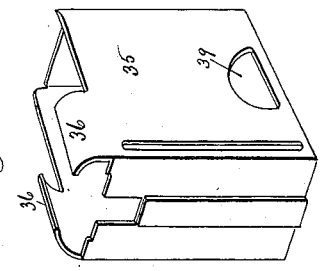
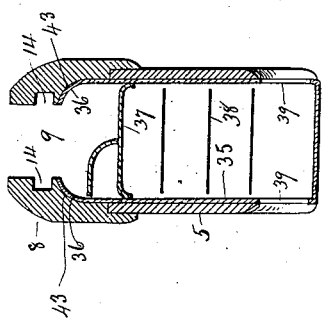

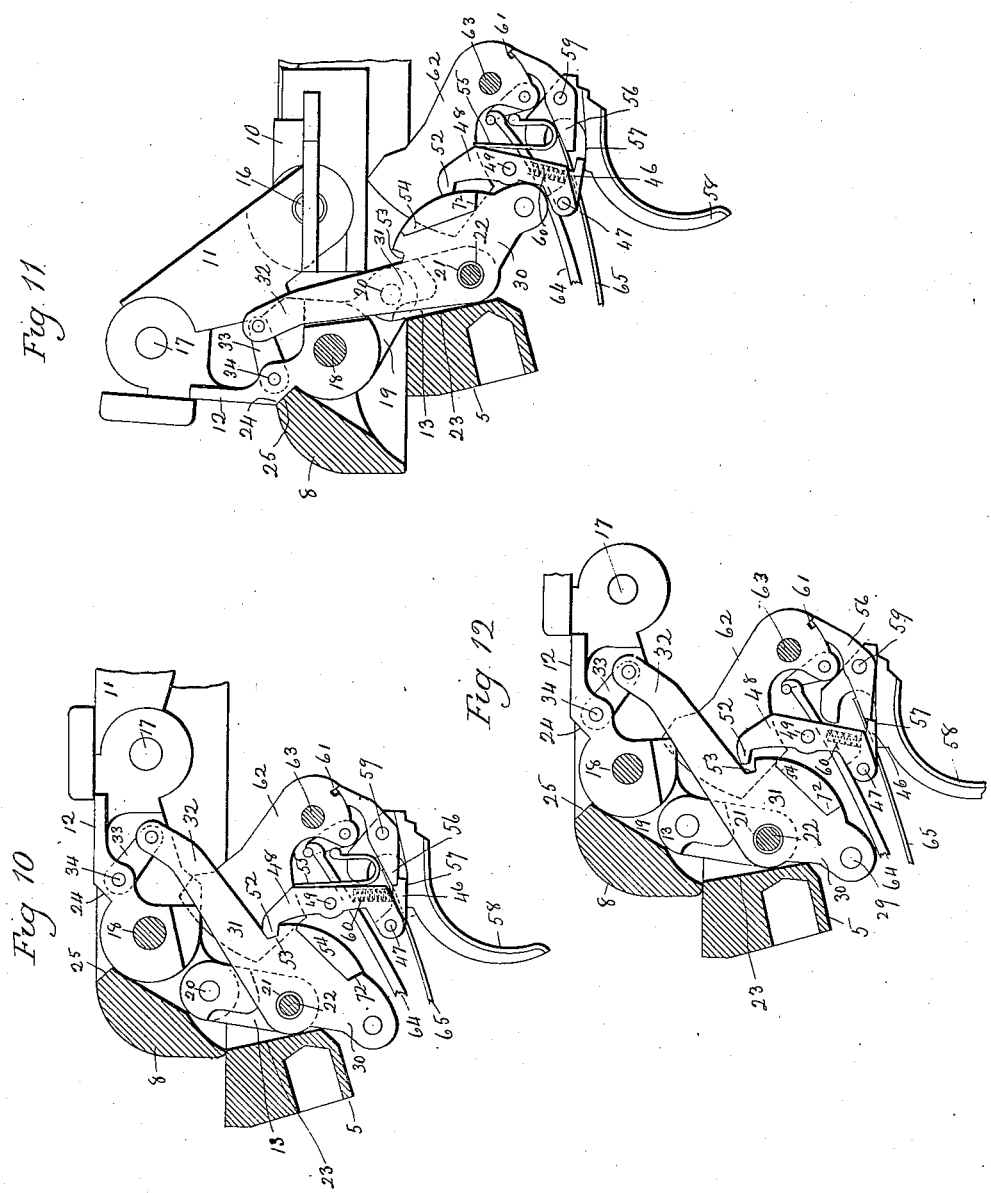

UNITED STATES PATENT OFFICE.

THOMAS G. BENNETT AND WILLIAM MASON, OF NEW HAVEN, CONNECTICUT, ASSIGNORS TO WINCHESTER REPEATING ARMS CO., OF NEW HAVEN, CONNECTICUT, A CORPORATION.

AUTOMATIC FIREARM.

SPECIFICATION forming part of Letters Patent No. 695,784, dated March 18, 1902.

Application filed September 30, 1901. Serial No. 77,002. (No model.)

*To all whom it may concern:*

Be it known that we, THOMAS G. BENNETT and WILLIAM MASON, of New Haven, in the county of New Haven and State of Connecticut, have invented a new and useful Automatic Firearm; and we do hereby declare the following, when taken in connection with the accompanying drawings and the letters of reference marked thereon, to be a full, clear, and exact description of the same, and which said drawings constitute part of this specification and represent, in—

Figure 1, a broken view in right-hand side elevation of an automatic firearm embodying our invention; Fig. 2, a broken plan view thereof; Fig. 3, a broken view of the arm in vertical longitudinal section, showing the arm closed; Fig. 3ª, a broken plan view of the receiver of the arm; Fig. 3ᵇ, a broken view of the receiver of the arm in vertical longitudinal section; Fig. 4, a broken view of the arm in vertical longitudinal section, showing the arm half-open; Fig. 4ª, a detached view in side elevation of the gun-opening link; Fig. 4ᵇ, a corresponding plan view thereof; Fig. 4ᶜ, a detached view in side elevation of the gun-closing lever; Fig. 4ᵈ, a corresponding plan view thereof; Fig. 4ᵉ, a detached view in side elevation of the ejector; Fig. 4ᶠ, a corresponding plan view thereof; Fig. 5, a broken view of the arm in vertical longitudinal section, showing it fully open; Fig. 6, a detached broken view in right-hand side elevation, showing the receiver, barrel-link, barrel, and barrel extension, the barrel, barrel-link, and barrel extension being shown in their forward or closed positions by full lines and in their intermediate positions by broken lines; Fig. 7, a corresponding but less comprehensive view showing the barrel, barrel-link, and barrel extension in their rearward or open positions; Fig. 8, a view in vertical transverse section on the line *a b* of Fig. 6, showing the bearing of the cartridge-retaining lips of the box-magazine against the side walls of the barrel extension; Fig. 9, a detached perspective view of the box-magazine; Fig. 10, a detached view, partly in vertical longitudinal section, but chiefly in side elevation, of the breech and trigger mechanisms, with particular reference to illustrating the interposition of the sear-fly between the trigger and the sear; Fig. 11, a similar view designed with particular reference to showing the retraction of the sear-fly from its normal position between the trigger and the sear, the breech-block and the links being shown at the limit of their recoiling movement; Fig. 12, a similar view showing how the trigger by being pulled back prevents the sear-fly from moving into its normal position between the trigger and the sear.

Our invention relates to an improvement in automatic firearms, the object being to produce a safe, effective, and convenient arm constructed with particular reference to reducing the friction of the recoiling parts to the minimum.

With these ends in view our invention consists in a gun having certain details of construction and combinations of parts, as will be herein shown, and pointed out in the claims. The arm chosen for the illustration of our invention is provided with a box-magazine; but this is not necessary, as many features of the invention might be employed in arms having other forms of magazines.

In carrying out our invention as herein shown we employ a barrel-link 2, the lower end of which is pivoted to a lug 3, formed upon the lower edge of the forward tang 4 of the receiver 5 and the upper end of which is pivoted to a lug 6, formed near the rear end of the lower face of the recoiling gun-barrel 7. This link embraces the said tang 4 and may be said to have three positions—viz., a forwardly-inclined position, which it has when the arm is closed and in which it is shown by full lines in Fig. 6 of the drawings, a vertical intermediate position, which it has when the arm is half-open and in which it is shown by broken lines in the same figure, and a rearwardly-inclined position, which it has when the arm is open and in which it is shown by full lines in Fig. 7 of the drawings. The recoiling gun-barrel 7 is provided with a box-like barrel extension 8, which in one view of it may be considered as constituting the upper portion of the receiver of the arm. This barrel extension is formed with a long chamber 9, Fig. 8, for the reception of the breech-block 10, the forward toggle-link 11, the rear toggle-link 12, and the gun-opening link 13. The side walls of the said barrel extension are formed with grooves or ways 14 for the reception of the guiding-ribs 15 of the breech-block.

The forward toggle-link 11 is connected to the rear end of the breech-block 10 by a pin 16. The two toggle-links are connected together by a pin 17. The rear toggle-link is pivotally connected by a pin 18 to the rear end of the barrel extension, the rear end of which barrel extension is pivotally connected to the receiver 5 by means of a rearwardly and downwardly projecting arm 19, formed integrally with the rear end of the rear toggle-link, and pivotally connected, by means of a pin 20, with the upper end of the gun-opening link 13, which is pivotally connected with the receiver by being mounted upon a bushing 21, receiving a pin 22, the ends of which are supported in the side walls of the receiver. By reference to Fig. 3 of the drawings it will be seen that the center of the pin 17 is located below the centers of the pins 16 and 18 when the gun is closed, so that the toggle-links are braced to take the shock of the recoil, which tends to force them downward instead of upward.

It will now be seen that the arm 19 of the rear toggle-link 12, acting in conjunction with the gun-opening link 13, pivotally connects the rear end of the barrel extension 8 with the receiver 5 of the arm in the same way that the barrel-link 2 pivotally connects the gun-barrel with the forward end of the receiver through the forward tang 4 thereof, whereby the said barrel and barrel extension rise at the beginning of their recoiling action and move rearward and upward in a circular path until they reach their intermediate or highest positions, and then descend rearward and downward in a path of the same curvature until they reach the limit of their rearward excursion, and the gun is fully open, returning in the same path during their forward or gun-closing excursion. These three positions of the barrel and barrel extension are illustrated by Figs. 6 and 7. The lifting of the barrel extension will never be sufficient, however, to break the joint formed by its fitting down over the upper edge of the receiver, as clearly shown in Fig. 8. This swinging action of the barrel and barrel extension reduces the friction of the recoiling action of the arm to the minimum and enables a correspondingly light gun-closing spring to be used, far more friction being developed when the barrel extension slides upon the receiver throughout its recoiling and returning movements.

When the breech-block 10 begins to recoil with the barrel and barrel extension, the gun-opening link swings rearward until it is brought to a stop by the engagement of its rear face with the said recoil-abutment 23. During this rearward movement of the gun-opening link the barrel extension is slightly lifted and may be said to turn upon the pin 22 as upon a center; but after the gun-opening link has been brought to a stop against the recoil-abutment face the said barrel extension begins to turn upon the pin 20, which connects the upper end of the gun-opening link 13 with the arm 19 of the rear toggle-link 12. As the recoil continues the rear toggle-link 12 turns upon the pin 18, whereby its forward end is lifted and with it the rear end of the forward toggle-link 11, which retracts the breech-block 10, which is confined to movement in a straight line in the barrel extension by the grooves or ways 14 therein. The gun-barrel, barrel extension, and breech-block recoil together, as will appear from the foregoing description, until the rear link 12 begins to turn on the pin 18, at which time the retraction of the breech-block with respect to the barrel and barrel extension begins. It thus appears that the gun-barrel, barrel extension, and breech-block recoil together until the gun-opening link is brought to a full stop against the recoil-abutment face 23. The front and rear toggle-links continue to lift and retract the breech-block until they reach their full open or folded positions, in which they are shown in Fig. 5, the forward link being brought to a bearing on the rear link and the face 24 of the rear link being brought into engagement with a bearing-face 25 at the rear end of the barrel extension.

The movement of the breech-block and the toggle-links into their full open and folded positions is immediately followed by their forward excursion into their normal or closed positions under action of the spiral gun-closing spring 26, which is located in the butt-stock 27 and acts through a long connecting-rod 28, attached to the forward end of the said spring and hooked over a pin 29, located in the rearwardly-extending arms 30 of a skeleton gun-closing lever 31, which is mounted upon the bushing 21, receiving the pin 22, before mentioned. The forwardly-extending arms 32 of this gun-closing lever are connected, by means of short stirrup-links 33, with the rear toggle-link 12 by means of a pin 34, which is located sufficiently forward of the pin 18 of the said toggle-link to secure leverage required for the action of the gun-closing spring 26 upon the forward toggle-link 11 and the breech-block 10, the said toggle-links being drawn down under the action of the said spring and the block shot forward into its closed position.

The sheet-metal box-magazine 35 herein shown is designed for the reception of a vertical column of staggered cartridges which are retained in the magazine by two inwardly-curved cartridge-retaining arms 36, formed at the top of its rear end. This magazine is provided with a follower 37 and a follower-spring 38 and formed at its lower end with two finger-holes 39 to facilitate seizing it and withdrawing it from the receiver in which it is yieldingly held with constant upward pressure by a spring 40, provided at its forward end with a short threaded stud 41, entering the forward portion of the receiver and permitting the spring to be swung horizontally to one side or the other to permit the introduction and removal of the magazine, which, however, may take any other suitable form, as we do not confine ourselves to using the particular structure shown. The magazine is entered into a magazine-opening 42, formed for its reception in the forward part of the receiver, and is free to move up and down in this opening in consonance with the vertical rise and fall of the barrel extension in its recoiling and returning movements and at a right angle to the longitudinal axis of the gun-barrel. Under the action of the said spring 40 the cartridge-retaining arms 36 of the magazine are maintained in engagement with the curved walls 43 of the barrel-extension chamber 9, as seen in Fig. 8. We provide for the vertical movement of the magazine, as described, in order to facilitate the feeding of the cartridges from it to the chamber of the gun-barrel. When the breech-block is in its full-open position, its forward end stands just in the rear of the uppermost cartridge and in position to engage with the head thereof. Now when the block begins to move forward and rise the box-magazine is moved correspondingly upward by the action of the spring 40 until the block reaches the limit of its upward movement with the barrel extension, after which the block moves forward and downward until it reaches its closed position, the box-magazine being then correspondingly depressed against the tension of the spring 40 by the downward pressure exerted by the barrel extension upon the cartridge-retaining arms 36 of the magazine, which is thus caused to follow the vertical movement of the barrel extension, so that the uppermost cartridge is constantly maintained in a fixed relation to the breech-block during the feeding of the cartridge from the magazine into the cartridge-chamber of the gun-barrel.

For the ejection of the spent shell we provide a skeleton ejector, which swings upon the bushing 21 and the rear end of which may be said to stride the gun-closing link 13 even as the same is embraced by the gun-closing lever 31. The rear end of this ejector is formed with two upwardly-extending arms 44, which just before the breech-block reaches its full-open position are sharply impinged against by the rear edges of the forwardly-extending arms 32 of the gun-closing lever 31, whereby the striking-nose 45 at the forward extremity of the ejector is thrown sharply against the head of the spent shell, which is thus ejected through the top of the barrel-extension chamber 9, now left open by the retraction of the breech-block.

In automatic guns of this character the action of the mechanism under the force of recoil is so rapid in reloading the gun and recocking the hammer that the user of the arm cannot be relied upon to release the trigger quickly enough to prevent a plurality of shots as the result of one retraction of the trigger. To avoid that difficulty and enable the user of the arm to completely control it, as well as to prevent the arm from being fired until the breech-block is fully closed, we employ a sear-fly 46, mounted upon a pin 47 in the lower end of the sear-fly carrier 48, which is hung about midway of its length upon a pin 49, supported in a rearwardly-extending arm 50 of the lower tang 51. The upper end of the said sear-fly carrier 48 is formed with a nose 52, coacting with a notch 53, formed in and with a cam-surface 54, formed upon the right-hand arm 32 of the gun-closing lever 31, a spring 55, engaging with the said sear-fly carrier 48, exerting a constant effort to force the nose 52 of the carrier into the notch 53 aforesaid, whereby the sear-fly is moved forward into its normal position, in which it is interposed between the rear end of the sear 56 and the bearing-face 57 of the trigger 58, both of which are hung upon a pin 59 in the said tang 51. A sear-fly spring 60, located in a hole formed in the lower end of the sear-fly carrier 48, impinges against the upper edge of the sear-fly and exerts a constant effort to force it downward and prevent its forward end from riding over the upper edge of the rear end of the sear, the forward end of which is shaped to enter the cocking-notch 61, formed in the heel of the hammer 62, which is hung upon a pin 63 in the tang 51. The hammer is provided with a hammer-spring 64, extending rearwardly into the tang 51, while the sear is furnished with a sear-spring 65, also extending rearwardly into the tang and located under the hammer-spring 64. The trigger 58 has no independent trigger-spring, the office of which is performed by the sear-fly spring 60, which exerts a constant effort not only to push the sear-fly downward, but also to push the trigger forward and maintain it in that position.

It will be obvious by reference to Figs. 10 to 12, inclusive, of the drawings that unless the forward end of the sear-fly is interposed between the bearing-face 57 of the trigger and the rear end of the sear the latter will not be operated when the trigger is pulled and also that it will be impossible for the sear-fly carrier-spring 55 to insert the forward end of the sear-fly between the sear and the trigger except when rearward draft has been removed from the trigger and the tension of the sear-fly spring 60 allowed to act to push the trigger downward and forward. It must also be obvious that the sear-fly carrier 48 cannot be swung upon its pivot by the spring 55 until the notch 53 of the right-hand arm 32 of the gun-closing lever 31 has been brought into registration with the nose 52 of the sear-fly carrier. When the gun is fully closed, the said notch 53 is brought into registration with the nose 52, allowing the spring 55 to swing the sear-fly carrier 48 and insert the forward end of the sear-fly 46 between the lower edge of the rear end of the sear and the bearing-face 57 of the trigger, provided, of course, that at this time the trigger is not under rearward draft. Unless these conditions are fulfilled the gun cannot be fired. Nearly at the beginning of the recoiling action of the gun the gun-closing lever begins to swing rearward on account of its connection with the rear toggle-link 12, whereby the nose 52 of the sear-fly carrier is lifted out of the notch 53 in the said lever 31 and caused to ride upon the cam-face 54 thereof, whereby the sear-fly carrier is swung on its pivot and its lower end moved rearwardly, retracting the sear-fly 46 from its normal and operative position between the rear end of the sear and the bearing-face of the trigger. The sear-fly will be maintained in this retracted position during the completion of the recoiling action of the gun, so that the pulling of the trigger cannot release the hammer until the gun is again fully closed, at which time the gun-closing lever is swung to the limit of its forward movement, and so as to permit the nose of the sear-fly carrier to drop off the cam-face 54 and into the notch 53, which permits the spring 55 to act in turning the sear-fly carrier on its pivot, with the effect of moving its lower end forward, and thus inserting the nose of the sear-fly into its operative position between the rear end of the sear and the trigger. It will thus be seen that the sear-fly constitutes a safety device for preventing the gun from being fired except when it is fully closed. Furthermore, the construction described prevents in the automatic action of the gun the firing more than one cartridge in case the user of the gun does not remove rearward draft upon the trigger, for unless the trigger is allowed to come forward the sear-fly cannot be interposed by the spring 55 between the trigger and the sear, as shown in Fig. 12.

To provide for taking the shock of stopping the gun-barrel at the limit of its recoiling movement, we furnish it with a heavy depending stop-lug 66, the rear face of which impinges against a buffer 67, corresponding to it in area and backed by the forward bridge or web 68 of the receiver 5. This buffer is preferably composed of a block of vulcanized fiber, but any other material may be employed. This lug 66 moves back and forth in a chamber 69, formed in the receiver in front of the buffer 67.

To provide for locking the gun open for convenience in cleaning it or inspecting its mechanism, we mount a pivotal locking-piece 70 in the right-hand wall of the receiver, the pivot or stud on which this piece swings terminating at its inner end in a cam 71, which projects into the receiver in position to engage with a locking-shoulder 72, located upon the right-hand side of the gun-closing lever 31. When the gun is fully open and the gun-closing lever 31 is at the limit of its rearward movement, the cam 71 is brought into play for locking the said lever in that position by swinging the locking-piece 70 from its normal or forward position to its locking or rearward position, as shown by full and by broken lines in Fig. 1, the said piece being held in either of these two positions by spring-pins 73.

The breech-block is provided with two spring-extractors 74 of any approved construction and with a firing-pin 75, which is operated by a striker 76, located in the forward link 11; but these features of construction need not be described in detail, as they constitute no part of our present invention.

It is apparent that in producing our invention some changes in the construction shown and described may be made. We would therefore have it understood that we hold ourselves at liberty to make such alterations as fairly fall within the spirit and scope of our invention.

Having fully described our invention, what we claim as new, and desire to secure by Letters Patent, is—

1. In an automatic firearm, the combination with the receiver thereof, of a recoiling barrel and barrel extension, and means connecting the barrel and barrel extension with the receiver to cause the barrel and barrel extension to recoil and return in a circular path.

2. In an automatic firearm, the combination with the receiver thereof, of a recoiling barrel and barrel extension, and link connection between the barrel and barrel extension and the receiver, whereby the recoiling and returning action of the barrel and barrel extension is in a circular path.

3. In an automatic firearm, the combination with the receiver thereof, of a recoiling barrel and barrel extension, a link connecting the rear end of the barrel with the forward end of the receiver, and a link connecting the rear end of the barrel extension with the receiver, whereby the recoiling movement of the barrel and barrel extension is in a circular path.

4. In an automatic firearm, the combination with the receiver thereof, of a recoiling barrel and barrel extension, a breech-block mounted in the barrel extension, forward and rear toggle-links, the breech-block being connected with the forward end of the forward link, and a link connecting the rear toggle-link with the receiver at a point to the rear of the pivot of the said link whereby the recoiling movement of the barrel and barrel extension is in a circular path.

5. In an automatic firearm, the combination with the receiver thereof, of a recoiling barrel and barrel extension, a breech-block mounted in the said extension, rearward and forward toggle-links for operating the breech-block, the rear link being formed with a rearwardly-projecting arm, and a link connecting the said arm with the receiver.

6. In an automatic firearm, the combination with the receiver thereof, of a recoiling barrel and barrel extension, a link connecting the barrel with the receiver, a breech-block mounted in the said barrel extension, rear and forward toggle-links of which the rear link is provided with a rearwardly and downwardly projecting arm, and a link connecting the said arm with the receiver.

7. In an automatic firearm, the combination with the receiver thereof, of a recoiling barrel and barrel extension, a link connecting the barrel with the receiver, a breech-block mounted in the said barrel extension, rear and forward toggle-links of which the rear link is provided with an arm located to the rear of and below its pivot, a gun-opening link connecting the said arm with the receiver, and an abutment-surface located in the receiver for engagement by the said gun-opening link which swings rearward and engages with the said face, after which the toggle-links are thrown upward for the retraction of the breech-block.

8. In a firearm, the combination with the breech mechanism thereof, of a box-magazine movable in consonance with the movement thereof at a right angle to the longitudinal axis of the gun-barrel.

9. In a firearm, the combination with the receiver and the breech mechanism thereof, of a box-magazine mounted in the receiver in which it is vertically movable in consonance with the movement of the breech mechanism, and a spring coacting with the magazine and maintaining it in a predetermined position of engagement with the breech mechanism.

10. In an automatic firearm, the combination with the receiver thereof, of a recoiling barrel and barrel extension, connections between the barrel and barrel extension and the receiver, whereby the barrel and barrel extension are caused to recoil in a curved path, and a box-magazine moving in consonance with the described movement of the barrel and barrel extension to compensate for the vertical movement thereof with respect to the receiver.

11. In an automatic firearm, the combination with the receiver thereof, of a recoiling barrel and barrel extension, a box-magazine located in the receiver in which it is vertically movable and having its upper portion adapted to be engaged with the said barrel extension, and means for maintaining the said box-magazine in engagement with the barrel extension during the recoiling movement thereof.

12. In an automatic firearm, the combination with the receiver thereof, of a breech mechanism, a box-magazine located in the receiver and movable in consonance with the movement of the breech mechanism, and a spring pivotally connected with the receiver, engaging with the lower end of the box-magazine to yieldingly hold it in place and adapted to be swung to one side for the introduction and removal of the said box-magazine.

13. In an automatic firearm, the combination with the stock and the receiver thereof, of a recoiling barrel and barrel extension, a breech-block, a rear and a forward toggle-link therefor, means for folding the links upward for the retraction of the said block, a gun-closing lever pivotally connected with the receiver, and with the rear toggle-link at a point forward of the pivot thereof, and a spring located in the stock of the gun, connected with the said lever, and exerting a constant effort to draw the links downward and forward and so close the arm.

14. In an automatic firearm, the combination with the stock and the receiver thereof, of a recoiling barrel and barrel extension, a breech-block, a rear and a forward toggle-link therefor, a link connecting the rear end of the rear toggle-link with the said receiver, a gun-closing lever connected at its upper end with the rear toggle-link, and a gun-closing spring located in the stock of the gun and connected with the gun-closing lever.

15. In an automatic firearm, the combination with the receiver thereof, of a recoiling barrel and barrel extension, a breech-block, rear and forward toggle-links therefor, a gun-closing lever connected with the rear toggle-link, a spring connected with the said lever, exerting a constant effort to draw the links downward and forward, and a pivotal ejector coacting with the gun-closing lever which strikes the ejector and causes it to eject the spent shell.

16. In an automatic firearm, the combination with the receiver thereof, of a recoiling barrel and barrel extension, a breech-block, rear and forward toggle-links therefor, an opening link pivoted to the receiver and to the rear toggle-link, a closing-lever and spring for the operation thereof and an ejector, the said opening link, the closing-lever and ejector having the same center of movement.

17. In an automatic firearm, the combination with the breech-block thereof, of rear and forward toggle-links therefor, a pivotal gun-closing lever connected with the said links for moving them into their closed positions, a hammer, sear and trigger, a sear-fly and a sear-fly carrier coacting with the said pivotal gun-closing lever 18. In an automatic firearm, the combination with the receiver thereof, of a breech-block, rear and forward toggle-links therefor, a pivotal gun-closing lever, a spring coacting therewith for exerting a constant effort to move the breech-block and links into their closed positions, and a locking-piece mounted in the receiver of the arm and adapted to be engaged with the said pivotal gun-closing lever for locking the gun in its fully-open position.

19. In an automatic firearm, the combination with a receiver provided at its forward end with a clearance-space and with a transversely-arranged bridge or web forming the rear wall of the said space, of a recoiling barrel and barrel extension, a stop-lug located at the rear end of the barrel upon the lower face thereof, and a buffer located at the rear end of the said space and against the forward face of the said bridge or web, the said lug moving back and forth in the said space during the recoiling movements of the barrel and barrel extension.

In testimony whereof we have signed this specification in the presence of two subscribing witnesses.

THOMAS G. BENNETT.
WILLIAM MASON.

Witnesses:
DANIEL H. VEADER,
G. W. ALLEN.